United States Patent
Wijlhuizen

[11] Patent Number: 6,027,131
[45] Date of Patent: Feb. 22, 2000

[54] WORKING VEHICLE AS WELL AS A STEP LIFT UNIT THEREFOR

[75] Inventor: Jan Paul Wijlhuizen, Arnhem, Netherlands

[73] Assignee: T.C. Patent B.V., Arnhem, Netherlands

[21] Appl. No.: 08/785,731

[22] Filed: Dec. 5, 1996

[30] Foreign Application Priority Data

Dec. 5, 1995 [NL] Netherlands .......................... 1001816

[51] Int. Cl.⁷ ..................................................... B60R 3/00
[52] U.S. Cl. ......................................................... 280/166
[58] Field of Search ...................... 180/89.13; 280/163, 280/166; 187/244; 254/385, 386; 292/336.3; 16/112

[56] References Cited

U.S. PATENT DOCUMENTS

| | | |
|---|---|---|
| 650,691 | 5/1900 | Railton et al. .......................... 254/386 |
| 3,830,342 | 8/1974 | Allen ........................................... 187/9 |
| 4,071,260 | 1/1978 | Marshall, Sr. . | 
| 4,073,501 | 2/1978 | Grow . |
| 4,168,134 | 9/1979 | Pohl . |
| 4,269,395 | 5/1981 | Newman et al. ........................ 254/386 |
| 4,324,317 | 4/1982 | Winkelblech . |
| 4,356,894 | 11/1982 | Everett . |
| 4,531,350 | 7/1985 | Huthmacher ........................ 280/47.2 X |
| 4,664,584 | 5/1987 | Braun et al. ............................. 414/541 |
| 4,747,579 | 5/1988 | Rich ......................................... 254/386 |
| 5,092,617 | 3/1992 | Jones, Jr. . |

FOREIGN PATENT DOCUMENTS

| | | |
|---|---|---|
| 36 18477 | 12/1987 | Germany . |
| 2 140 749 | 12/1984 | United Kingdom . |

Primary Examiner—Christopher P. Schwartz
Assistant Examiner—Daniel Yeagley
Attorney, Agent, or Firm—Young & Thompson

[57] ABSTRACT

A working vehicle (1) contains a chassis (2) with a driver's cabin (3) which is equipped with a step construction (30) with at least one step (5). According to the invention the step (5) is coupled to a lifting and lowering device (11) which is controllable by switching devices (21) which are located at least in the vicinity of the step construction. Climbing in or out is thus considerably facilitated and does not involve any or hardly any burdening of the joints of the driver. It is expected that with this; complaints of an orthopedic nature with drivers can be decreased.

6 Claims, 4 Drawing Sheets

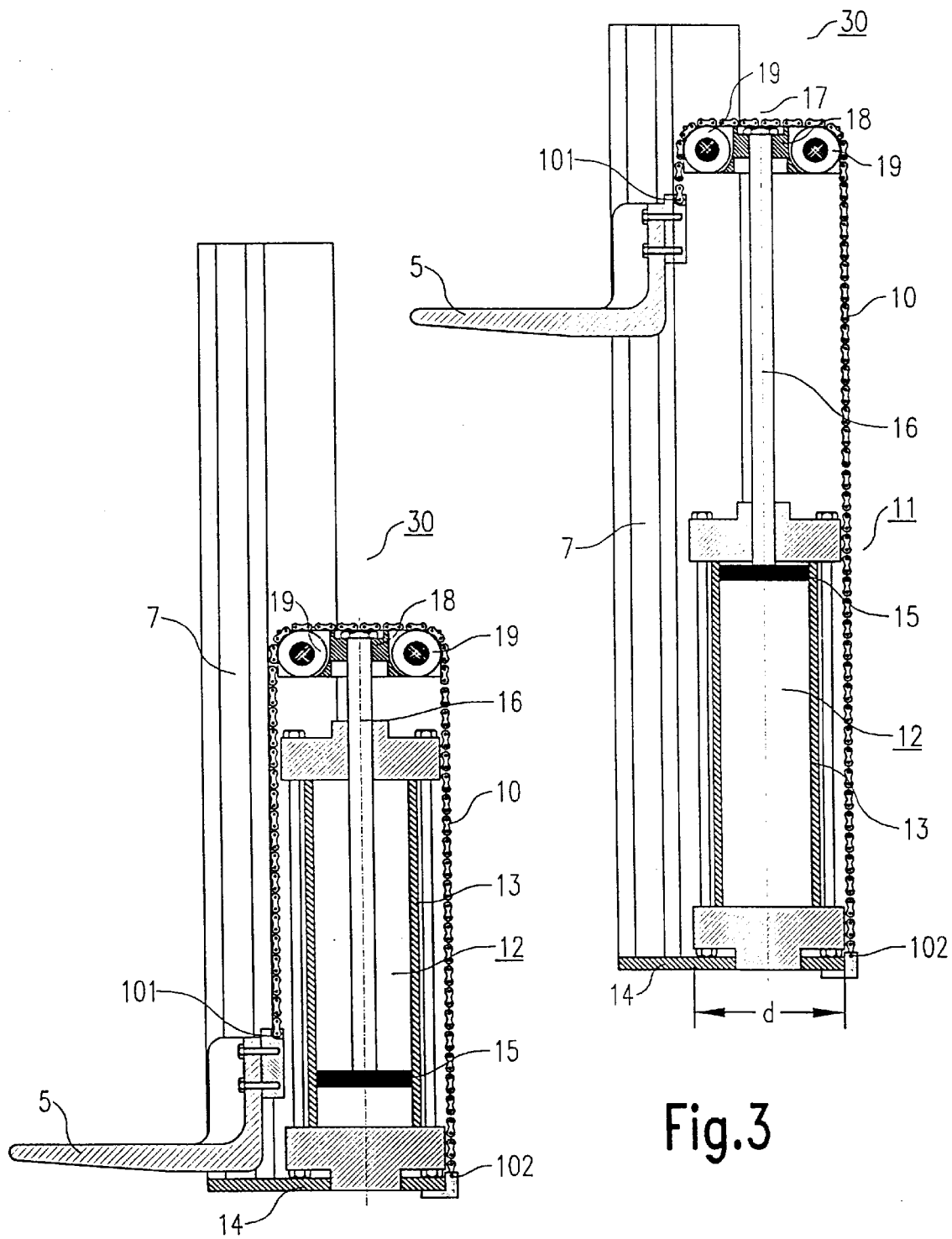

WORKING VEHICLE AS WELL AS A STEP LIFT UNIT THEREFOR

FIELD OF THE INVENTION

The present invention relates to a working vehicle containing a chassis with a driver's cabin which is equipped with a step construction with at least one step. The notion working vehicle should be seen in a broad sense, so that it includes, for example and not exclusively, trucks, crane vehicles, tractors and also various kinds of vehicles for earth moving.

BACKGROUND OF THE INVENTION

Such vehicles have in common that the driver thereof usually sits in a relatively highly-placed cabin. In order to facilitate climbing in and out a step construction is usually provided with one or more steps. By means of this the driver climbs up to and down from his driver's place.

Research has shown that this climbing up and down is a primary cause of health problems which could arise in the course of time, especially for those drivers whose work entails them having to climb in and out regularly, whereby furthermore there is a large temptation when climbing down to jump, whether or not half-way. In respect of these health problems one should think particularly of complaints of an orthopedic nature, such as wear of the knee and ankle joints and back and neck vertebrae. It is not seldom that this leads in the long run to permanent invalidity and inability to work of the driver. For this reason proposals have been made to lower the cabin in order to avoid such a high climb. Such an adjustment of the vehicle, however, soon encounters unacceptably high costs. Furthermore, without additional measures, the view of the driver would decrease as a result thereof.

SUMMARY OF THE INVENTION

The present invention aims inter alia at achieving a vehicle of the sort mentioned in the opening paragraph in which the aforesaid objections are avoided.

To that end a vehicle of the sort mentioned in the opening paragraph has the characteristic, according to the invention, that the step is coupled to a powered lifting and lowering device which is controllable by means of switching devices which are located at least in the vicinity of the step. In this manner the driver only has to place his foot on the step and activate the lifting and lowering device by means of the switching devices. The driver is thus brought to the desired level and can climb in or out with his other foot. It will be clear that the burden on the joints of the driver can thus be limited to a minimum, also due to the fact that the temptation to jump out of the cabin is virtually entirely suppressed.

A working vehicle can be equipped from the very beginning in accordance with the invention, but it is also possible to convert an existing, conventional vehicle in accordance with the invention. In that case the existing step construction is removed and is replaced by one which is in accordance with the invention. Because the build-in space therefor can be limited, the lifting and lowering device according to the invention is preferably constructed as compact as possible. A preferred design of the working vehicle therefore has, according to the invention, the characteristic that the step is included in a linear guide, that the lifting and lowering device contains a connecting rod which describes a linear movement when it is powered in a direction which is virtually parallel to the guide, that a housing for the connecting rod is attached, at a side which is turned away from the step, to or near a basis of the step guide, and that a transmission is included between the connecting rod and the step, which contains a cable which is attached at one end to the step and at the other end to or near the housing of the connecting rod, and thereby runs over one end of the connecting rod.

Thanks to such a cable a double transmission is achieved, as it were, whereby the movement of the step is twice as large as the movement described by the connecting rod. The lifting device can therefore be implemented in a particularly compact manner. The cable transmission furthermore has the additional advantage that as a result thereof the connecting rod is virtually only burdened in its direction of movement, which benefits the durability of the device. The notion cable, by the way, should be taken in a broad sense here, so that it is not only taken to mean a cable in the pure sense of the word but also other similar transmissions within the described framework, such as, for example, by means of a belt, band, cord, chain or band and the like.

BRIEF DESCRIPTION OF THE DRAWINGS

The present invention also relates to a step lift unit for application in the working vehicle described above. The invention will now be explained in more detail on the basis of an implementation example and a drawing. In the drawing the following figures show:

FIG. 2 a side view of a step lift unit of the working vehicle of FIG. 1, drawn in the lowest position;

FIG. 3 a side view of the step lift unit of the working vehicle of FIG. 1, drawn in the top position;

DETAILED DESCRIPTION OF THE INVENTION

The figures are purely schematic and not drawn to scale. Some dimensions have been shown strongly exaggerated particularly for the benefit of clarity. Corresponding parts have been indicated in the figures as far as possible by the same reference number.

Figure 1:
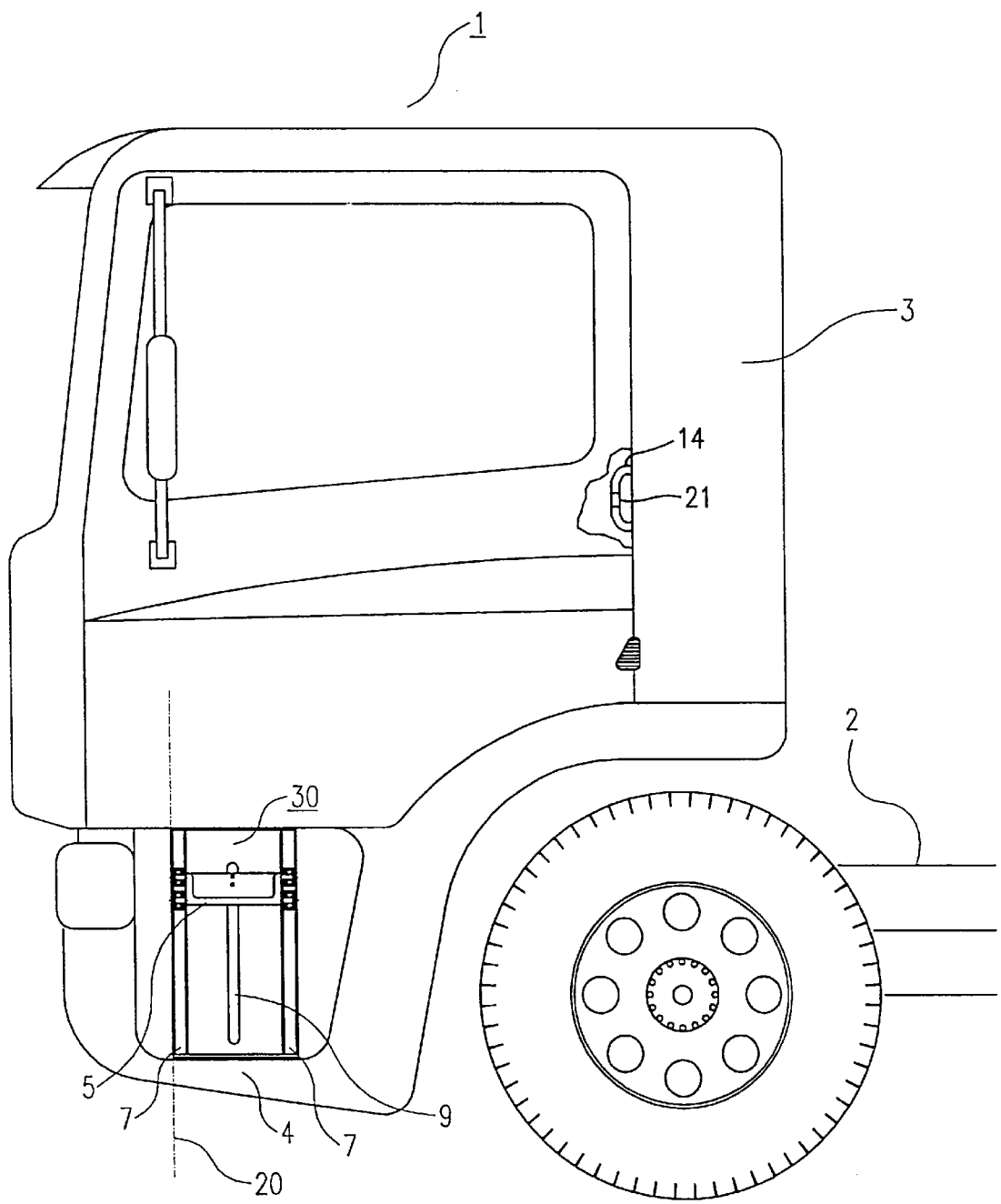
FIG. 1 a side view partially cut away of a working vehicle according to an implementation example of the invention.
Figure 4:
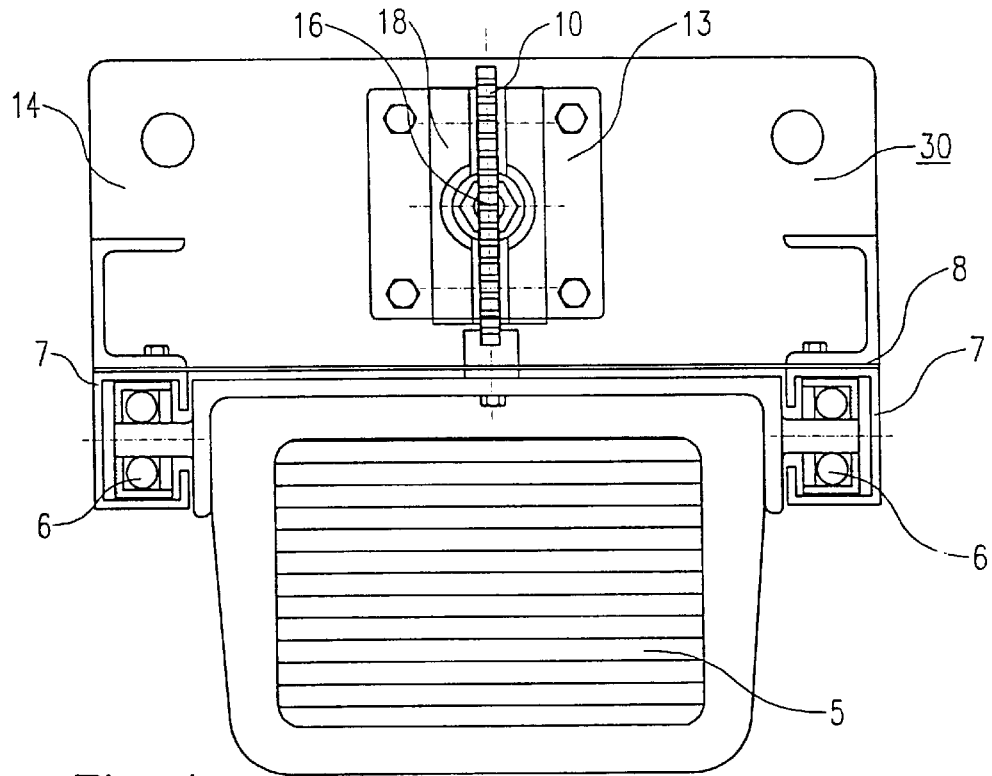
FIG. 4 a top view of the step lift unit of the working vehicle of FIG. 1.
Figure 5:
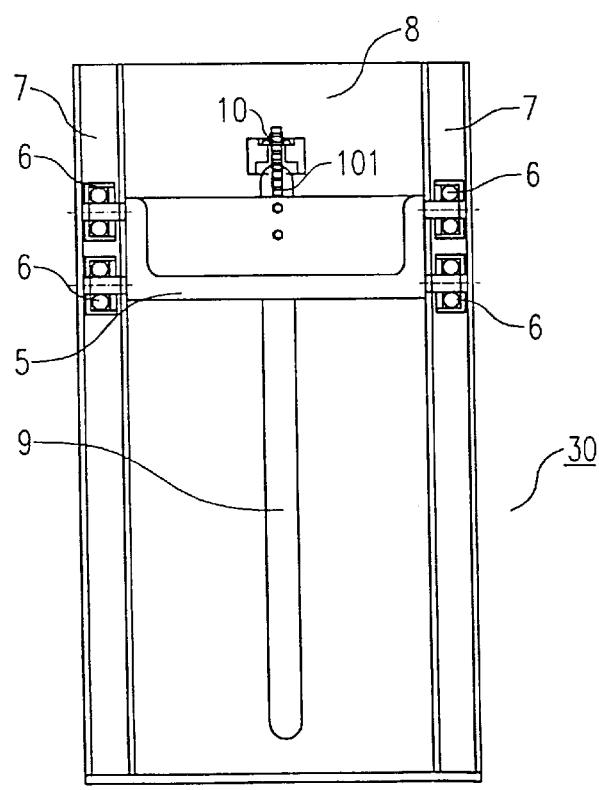
FIG. 5 a front view of the step lift unit of the working vehicle of FIG. 1.

FIG. 1 shows a working vehicle 1, in this case a truck, with a driver's cabin 3 which is located at the front on a chassis 2. In order to facilitate climbing in and out in the case of the relatively high placed cabin 3 a step construction 4 in the vicinity thereof is equipped with one or more steps 5 on which the driver can step. In the present example the vehicle 1 is equipped particularly in accordance with the invention with a step lift unit 30, which is shown in more detail in the following figures.

The step lift unit contains a step 5 having opposite sides adjacent to the step which are conducted by means of roller bearings 6 on both sides in a vertically placed linear guide 7. The step 5 is thus movable in front of a rear wall 8 with a central groove 9 which extends across a part of the height. Via the groove 9 a first end 101 of a chain 10 is attached, which chain constitutes a part of a cable transmission from a lifting and lowering device 11 which is attached behind the rear wall 8. The parts of the step lift unit are constructed as far as possible from metal for the sake of durability, for example steel, stainless or not, or aluminum. While the step lift unit itself can be fixed to the chassis 2 or the cabin 3, the unit is preferably attached as in this case hingeable around a vertical axis 20. The unit can then be turned away if the engine of the vehicle 1, which is often located under the cabin, must be accessible for maintenance.

The lifting and lowering device 11 contains in this example a controllable pressure cylinder 12, for example a pneumatic or hydraulic cylinder, of which the cylinder housing 13 is attached on a side which is turned away from the step 5 to or near the basis 14 of the step guide 7. A piston 15 in the cylinder housing 13 carries a connecting rod 16 which thus, when powered, carries out a linear movement in a direction parallel to the guide 7. As a result of the fact that a second end 102 of the chain 10 is firmly attached to the basis of the cylinder housing 13, the connecting rod 16 pulls the step 5 with it when it makes that movement. The chain 10 runs thereby at the end of the connecting rod 16 across a cable guide block 18 with guide rollers with bearings 19. Thereby the chain 10 is led in a direction across the direction of movement of the connecting rod 16 across a distance which is at least practically equal to the dimension d of the cylinder housing 13 in that direction. Thus the connecting rod 16 experiences virtually exclusively a burden which is directed vertically downwards according to its centre line 17, which burden can be absorbed extremely well by the cylinder 12. Wear to the cylinder 12 is thus limited to a minimum, which benefits the durability.

Thanks to the chain 10 a double transmission, as it were, is achieved, as a result of the fact that the movement of the connecting rod is transferred twice as large to the step 5. As a result of this the lifting and lowering device 11 can remain compact and can nevertheless bridge the entire stepping-in height. May it be noted, by the way, that such a transmission can also be achieved not only with a chain, but also, for example, with a cable, chord, band, belt or the like.

Figure 6:
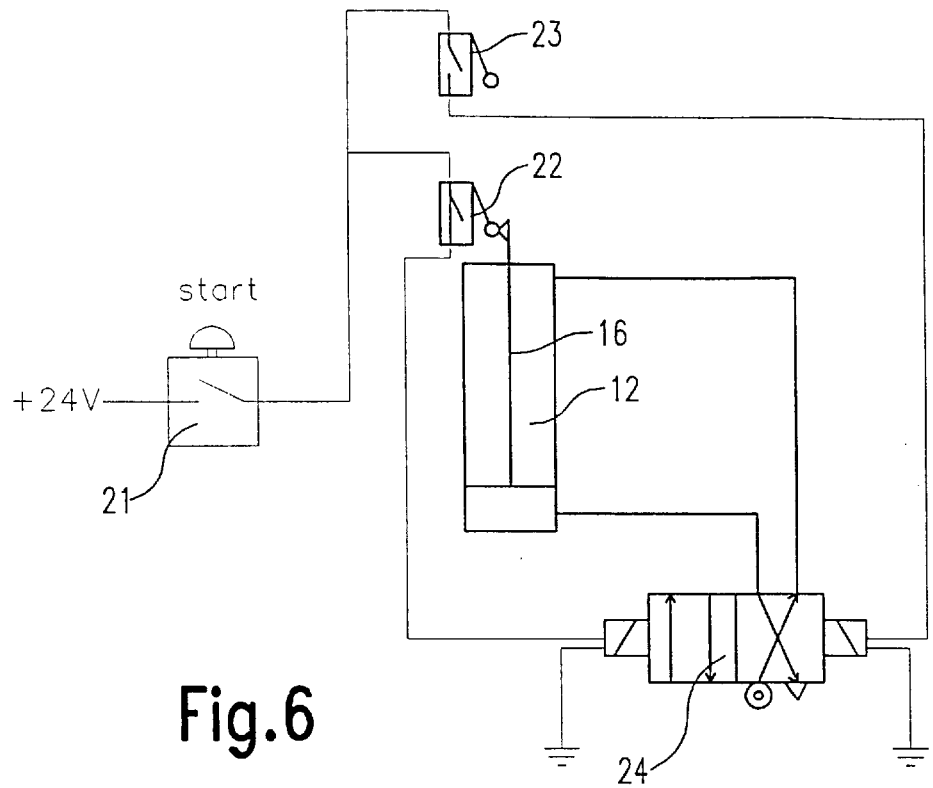
FIG. 6 a first electrical circuit diagram for powering the device of FIGS. 2–5.
Figure 7:
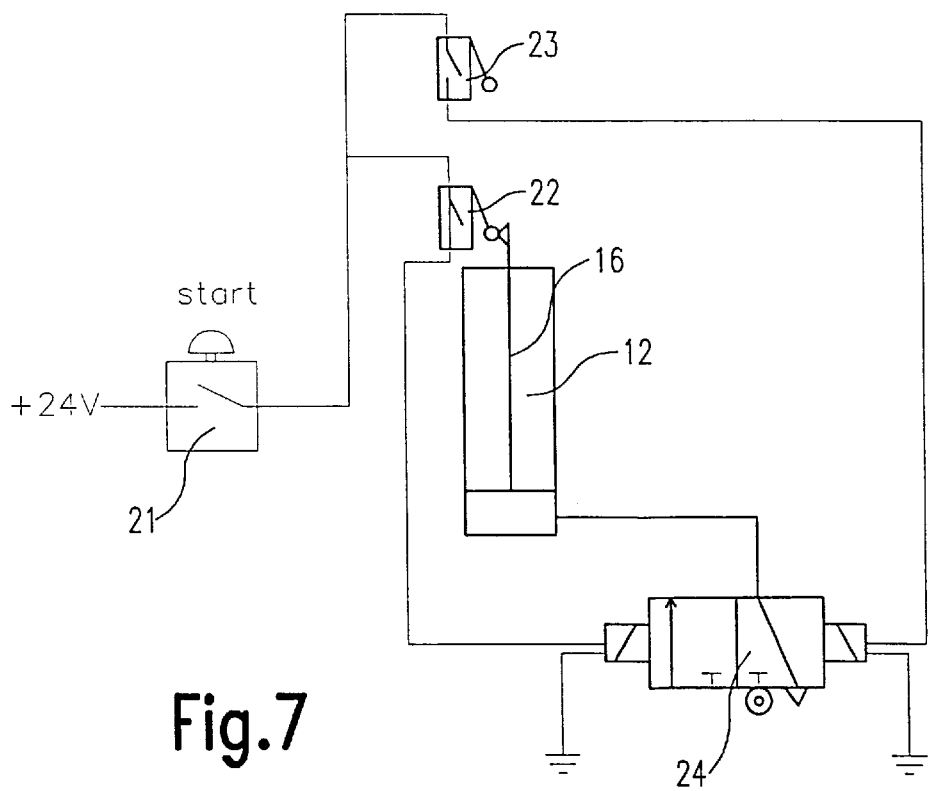
FIG. 7 a second electrical circuit diagram for powering the device of FIGS. 2–5.

After having opened the door of the cabin 3 the driver grips the handle 4 which is attached near to the step in the cabin 3 and steps preferably with his left foot onto step 5. In or on the handle switching devices are located with which the step lift unit is activated. The pressure cylinder 13 is pressurised as a result of which the connection rod 16 extends and brings the step 5 in approximately 2–3 seconds from the bottom position drawn in FIG. 2 to the top position drawn in FIG. 3. For this purpose use can be made of the pneumatic system which is already present on the vehicle. The unit is equipped with electronic or electro-mechanical starting and ending point detection means 22, 23 see the circuit diagrams of FIGS. 6 and 7, as a result of which the process automatically stops as soon as an end position is reached. The detection means 22, 23 furthermore ensure that when the end position is reached the voltage poles across a pneumatic or hydraulic valve switch 24 are reversed, so that when the switch device 21 is moved again the direction of movement of the connecting rod 16 and step 5 will be in the opposite direction. Preferably detection means 22, 23 are assumed thereby which are integrated inside the pressure cylinder, which reduces the chance of malfunction.

At the top position of the step 5 the driver steps with his other, preferably right, foot into the cabin 3 in order to take his place on his driver's chair. The step 5 remains in this top position until the driver steps out again. In that case he steps, preferably with his left foot, on the step 5 and holds the hand grip. Then he switches the lowering and raising device on again with the switch device 21, as a result of which the pressure falls away via the regulating valves 24 in the cylinder 12, which have had their polarity changed, and the step drops in 2–3 seconds to its lowest position. The driver can now step off the step 5. The starting point detection devices 22 ensure that the polarity of the regulating valves 24 is again changed and the process automatically stops.

It will be clear that such a manner of climbing in and out results, if not in absolutely no burden, then in any event in a considerably lighter burden for the limbs of the driver. It is therefore expected that complaints which occur very commonly in practice will be reduced considerably, to the extent that those complaints could be attributed to climbing in and out of the cabin.

While the invention has been explained further on the basis of just one implementation example, it will be clear that the invention is not limited at all to the example which has been given. On the contrary, within the framework of the invention there are still many variations, modifications and designs possible for an average expert without demanding an inventive effort of him. For example, the pressure cylinder can be equipped with a buffer block or a reduction valve to have the step stop less abruptly when it reaches an end position. The switch devices have been drawn in a schematic manner in the diagrams of FIGS. 6 and 7 as a relatively coarse start button, but in actual fact are integrated in an ergonomic manner in or on the handle or elsewhere.

Besides being driven by a pressure cylinder the step can also be driven in another manner, for example by means of a powerable spindle or a switchable winch with a cable. A pressure cylinder, however, has a preference in the above example due to its proven reliability, compactness and compatibility with the pressure system of the vehicle which is usually already present. At the same time the step can also be connected directly to the connecting rod, whereby, however, the advantage of the double transmission and ideal burden will be missing.

The vehicle cannot only be equipped from the very beginning, i.e. from the factory, in accordance with the invention, but it is also possible to build in a step lift unit according to the invention later. For that purpose the invention also provides for such a unit in itself, as shown in FIGS. 2–5.

I claim:

1. Working vehicle comprising:

a chassis with a driver's cabin which is equipped with a step construction with at least one step, said step being coupled to a powerable lifting and lowering device which is controllable by switching devices located at least in the vicinity of the step, said step having opposite sides adjacent to the step, said sides being disposed in a linear guide coupled to a basis, said lifting and lowering device including a connecting rod which, when powered, describes a linear movement in a direction which is substantially parallel to the guide;

a housing for the connecting rod attached at a side which is turned away from the step, to or near the basis of the linear guide; and a transmission disposed between the connecting rod and the step, said transmission including a cable which is attached at a first end to the step and at a second end to or near the housing of the connecting rod, said first and second ends being located on opposite sides of the connecting rod, whereby the cable runs over an end of the connecting rod.

2. A working vehicle according to claim 1, wherein the end of the connecting rod is equipped with a cable guide block for guiding the cable in a direction perpendicular to the movement of direction of the connecting rod across a distance which is at least, or substantially, equal to the dimension of the housing of the connecting rod in that direction.

3. A working vehicle according to claim 1, wherein the connecting rod is coupled to a piston of a controllable pressure cylinder.

4. A working vehicle according to claim 1, further comprising a handle mounted in or near the step construction towards inside the cabin, said handle being equipped with the switching devices.

5. A working vehicle according to claim 1, wherein the step and the lifting and lowering device constitute a part of a step lift unit which stands on its own.

6. A working vehicle according to claim 5, wherein the step lift unit is hingeably connected around a vertical axis with the chassis of the vehicle.

* * * * *